No. 831,594. PATENTED SEPT. 25, 1906.
W. E. BIRKET.
VEHICLE.
APPLICATION FILED AUG. 26, 1905.
3 SHEETS—SHEET 3.
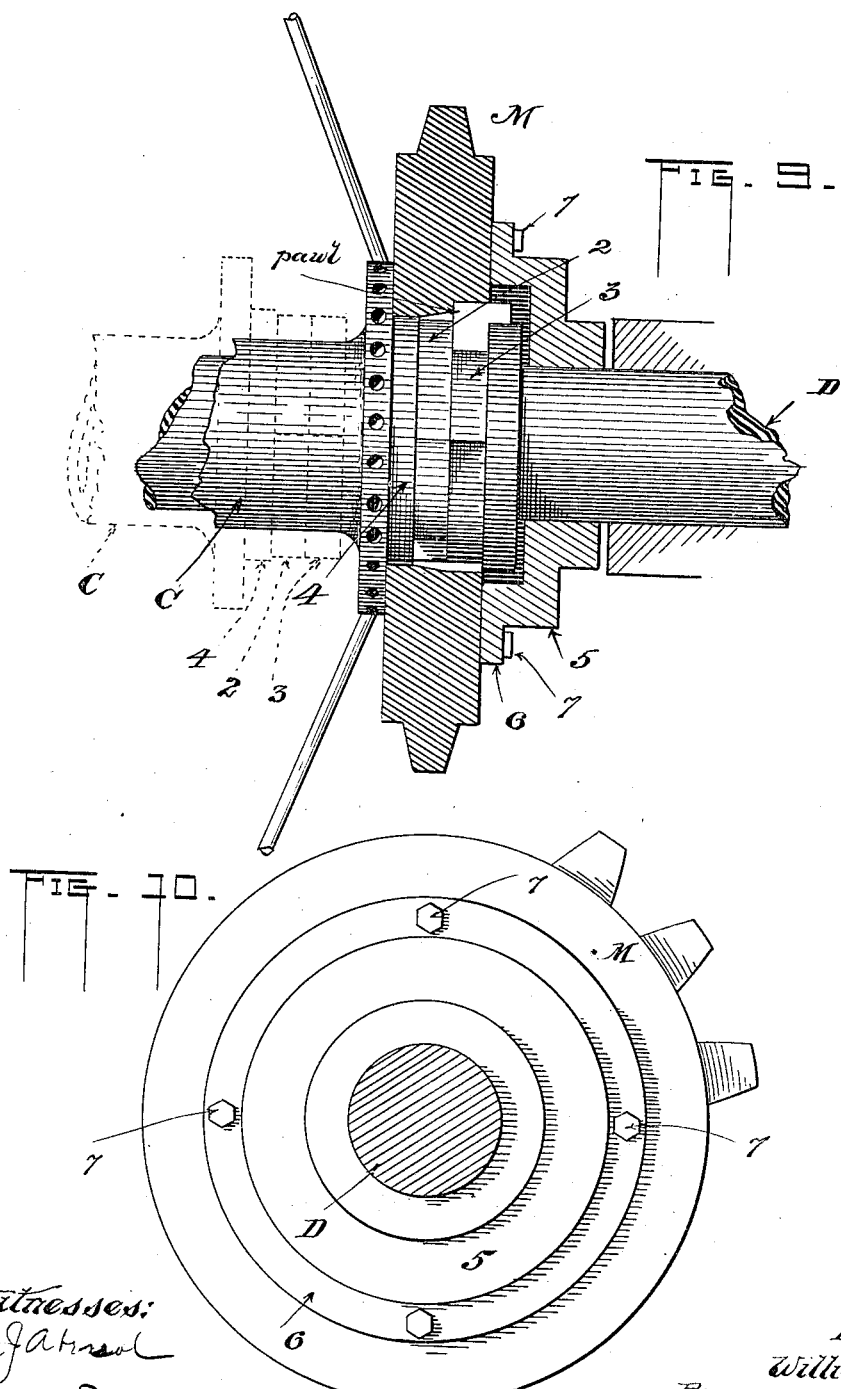

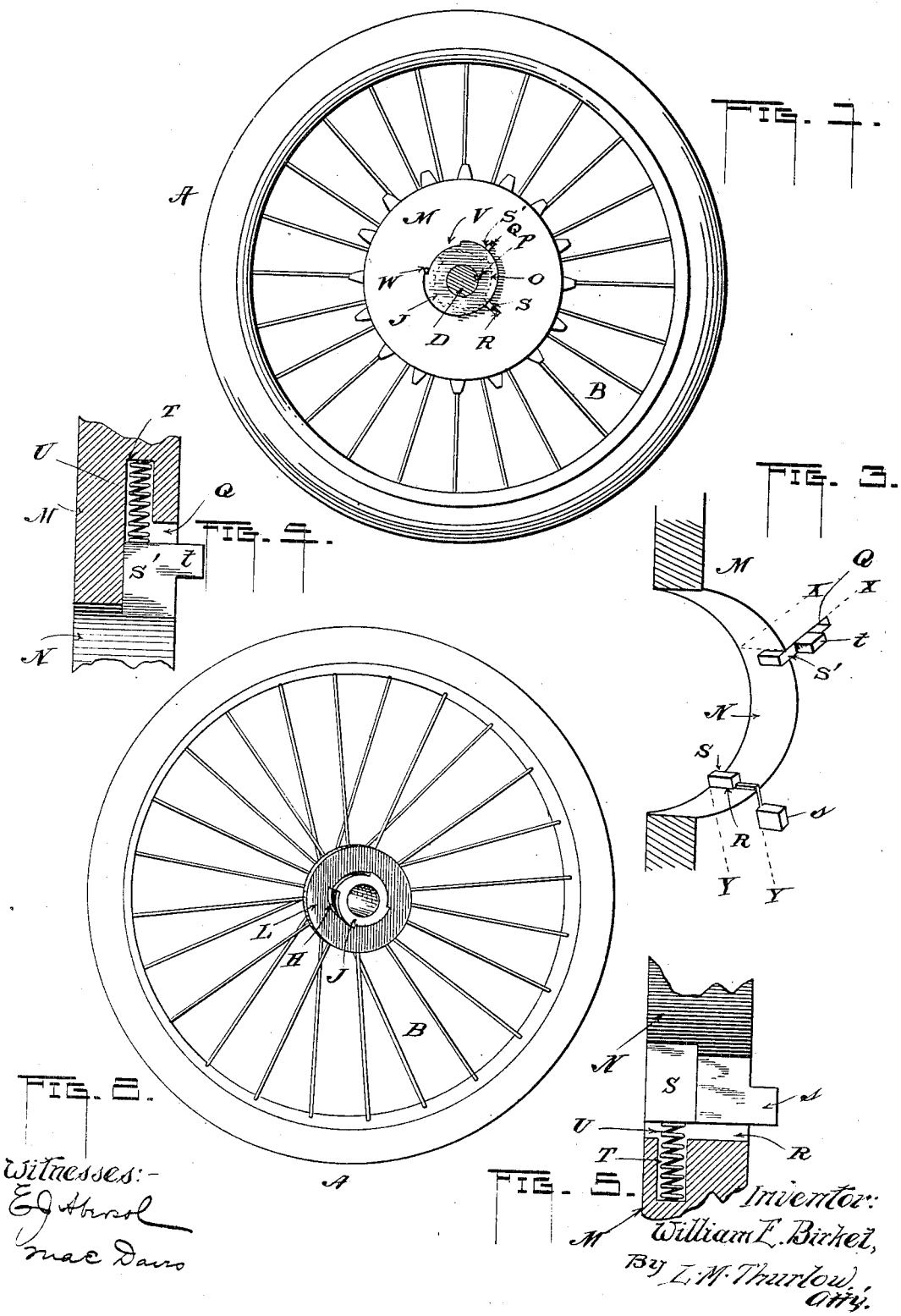

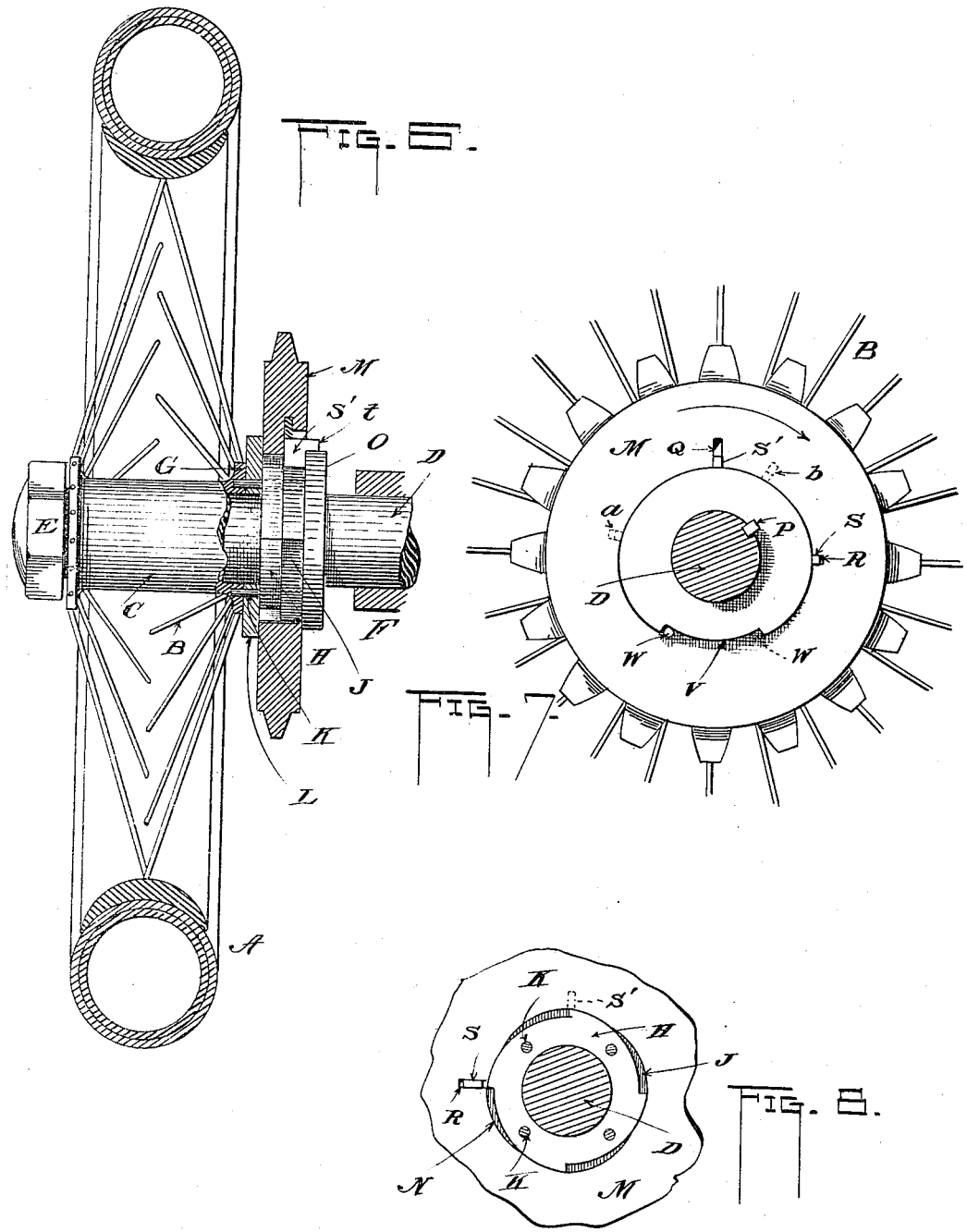

UNITED STATES PATENT OFFICE.

WILLIAM E. BIRKET, OF PEORIA, ILLINOIS.

VEHICLE.

No. 831,594.

Specification of Letters Patent.

Patented Sept. 25, 1906.

Application filed August 26, 1905. Serial No. 275,863.

*To all whom it may concern:*

Be it known that I, WILLIAM E. BIRKET, a citizen of the United States, residing at Peoria, in the county of Peoria and State of Illinois, have invented certain new and useful Improvements in Vehicles; and I do hereby declare that the following is a full, clear, and exact description of the invention, which will enable others skilled in the art to which it appertains to make and use the same.

This invention pertains to improvements in mechanism of that class known as "horseless vehicles," and relates more particularly to driving-gear, such vehicles having combined therewith a compensating means.

The particular object of my invention is to provide a compensating device for horseless vehicles which will permit both or all of the ground-wheels to be power-driven, while allowing them free movement, so that they can "run ahead" of the applied power.

A further object of my present invention is to greatly simplify and cheapen compensating construction in vehicles of this class, while producing a thoroughly efficient driving means.

In the appended drawings, forming a part of this application, Figure 1 is a side view of a wheel of the vehicle, showing a driving sprocket-wheel and a pawl-shifting member carried on the axle. Fig. 2 is a perspective view of the wheel with the sprocket-wheel and pawl-shifting member and axle removed. Fig. 3 is a perspective view, in part section, of a portion of the sprocket-wheel, showing a pair of pawls carried therein. Fig. 4 is a sectional view of a portion of the said sprocket-wheel, showing one of the pawls, said view being taken on line X X, Fig. 3. Fig. 5 is a similar view of the sprocket-wheel, taken on line Y Y of said Fig. 3, showing another pawl. Fig. 6 is a partial sectional elevation of a ground-wheel, showing a portion of its hub and the sprocket-wheel in section. Fig. 7 is a side view of the sprocket-wheel, the pawl-shifting member, and the axle in cross-section. Fig. 8 is a view of a portion of the back side of the sprocket-wheel, showing the ratchet members therein, which are illustrated in Fig. 2. Fig. 9 is a longitudinal section of a modified form of the mechanism shown in Fig. 6. Fig. 10 is a side view of the same, showing the axle in cross-section.

The ground-wheel is indicated by the reference-letter A, having the spokes B and hub C, respectively. Through the latter extends the axle D, receiving at its outer end a wheel-retaining nut or cap E. The axle is loosely carried in bearings on the body of the vehicle, so that it is free to revolve, there being but a portion of one bearing shown at F in Fig. 6. To the flange G of the wheel-hub is secured a pair of ratchet-wheels (indicated by H and J) by means of a series of pins or screws K, Figs. 6 and 8, there being interposed between the wheel H and the flange G a plate L, likewise secured to the flange by said pins or screws K. I desire to state, however, that any other means of securing the plate and the ratchets to the hub may be resorted to, and they may even form a part of said hub, it being intended in any case to have them stationary on said hub for the purposes to be hereinafter described. The two ratchet-wheels consist, preferably, of four teeth, each evenly spaced apart, as shown, the teeth of one being opposed or set opposite to those of the other wheel, as shown, and these may be made separate or may be formed in one solid member, as desired. I next provide a sprocket-wheel bored out centrally to pass over said ratchets with its inner face lying against the plate L, as shown in Fig. 6. This is then followed by a plate O, which lies against the wheel, being secured to the axle D, as by a key P, and adapted, therefore, to turn with said axle.

At Q and R are two radiating slots in the sprocket-wheel, separated by a fourth of the distance around the bore N, and in each slot is a pawl, (one indicated by S and the other by S',) these being in the slots R and Q, respectively. The slot Q extends but half-way through the sprocket-wheel, and therefore its pawl S' can only extend half-way, being exposed on the outer surface of said wheel, as shown in Figs. 1, 6, and 7. The other slot extends entirely through the wheel, opening at both sides, as shown in Figs. 7 and 8. The pawl S, carried in said slot, is exposed at the inside of the wheel, as in Figs. 3, 5, and 8. It will be understood by a glance at Fig. 3 that one pawl is designed to protrude from the wheel into the bore N and that one of them is at the outside of the wheel and the other at the inside, whereby they are in line with and engage separate ratchet-wheels. There is a recess T behind each slot Q and R, having a spring U therein to keep the pawls thrown toward the ratchets with which they are designed to engage. Projecting beyond the outer face of the sprocket-wheel and formed with each pawl S and S' is an extension $s$ and $t$, respectively, designed to be engaged by the plate O, hereinbefore described, and by which said pawls are shifted against the tension of their springs. The said plate O is a cam in the form of an ellipse, Fig. 7, having in its edge a recess V, within which is designed to travel a pin W, secured in the sprocket-wheel.

In the position shown in Fig. 7 the shortest diameter of the cam is in line with the pawl S', which allows said pawl to approach and engage the ratchet-wheel for which it is intended. On the contrary, the pawl S is held out to its utmost limit by the cam at the greatest diameter, so that it is out of engagement with its ratchet-wheel. Now were the axle to remain stationary for the moment and the sprocket-wheel to be turned toward the left, as viewed in Fig. 7, the pawls will be advanced to take up the position shown by dotted lines at $a$, $b$ being the position for the pawls S' and S, respectively, and in this movement the pin W will likewise advance to the other end of the recess V of the cam, and in this progression it will be observed that the pawl S' will have moved up upon the cam portion at the left, thus disengaging it from its ratchet-wheel, while the pawl S will follow down the opposite cam portion to the shortest diameter of the plate O, thereby meeting and engaging its respective ratchet-wheel. In this movement, therefore, it will be seen that the positions of the pawls have just exactly been reversed from what they were before the movement, one being thrown into and the other out of engagement. It is to be understood that the sprocket-wheel in being reversed, due to the reversal of the engine or other agent, carries the pawls with it which alter their positions, due to the cam about which they travel, the latter being affixed to the axle, which is held momentarily by the friction existing between it and the bearings. The pin W in the ratchet-wheel travels through the recess V and only turns the cam after the pawls have been shifted to their positions of rest, the cam and axle then being revolved with said sprocket. Said pin, therefore, is only employed to maintain the cam and pawls in their proper relative positions.

In Figs. 6 and 7 the pawl S' is in engagement with the ratchet-wheel J. Now with the ratchet-wheel being driven in the direction of the arrow the ground-wheel will be revolved in the same direction, since said ratchet-wheel J is firmly fixed thereto. While moving in this direction said ground-wheel when traveling on the larger or outside curve as the vehicle turns as in a circle it will run ahead of its power—that is, will revolve faster than the sprocket-wheel which receives the power by reason of having to move faster than the opposite ground-wheel, also receiving power. Evidently if the vehicle is turned in the opposite direction the wheel that has run ahead of the power will be the driven one and the other will run ahead. If now the power is reversed, again viewing Fig. 7, the sprocket-wheel will be driven in the opposite direction, or contrary to the direction indicated by the arrow, and as this reversal takes place the pawls are carried around to the positions shown by dotted lines, as already explained, the cam causing the reversed position of said pawls by permitting pawl S to engage the wheel H and withdrawing pawl S' from engagement with ratchet-wheel J. The ground-wheel is thus power-driven in a direction opposite from that originally imparted to it. Again, it is to be seen that the wheel may run ahead of its power in this direction since the same conditions exist—i. e., the ratchet-teeth can pass under the pawl and past it when the ground-wheel is compelled by circumstances to revolve faster than the power drives the sprocket-wheel. In reversing the motion of the sprocket to drive in an opposite direction the friction between the axle and the bearings in which said axle is carried is greater than that existing between the pawls and cam, so that said pawls are shifted at once to reverse them, the pin W shifting at the same time to the other end of the recess V. Then the cam and shaft revolve with the sprocket and ground wheel. Evidently the disengaged pawl cannot reach its ratchet unless the sprocket is oscillated in the opposite direction to permit said pawl to approach nearer to the axle as it passes down the slope of the cam.

The plate L, secured to the wheel-hub, is merely employed as a bearing-point for the sprocket-wheel and to hold the pawl S in its position within the slot R. The cam O at the other side of the sprocket serves in the same capacity as the plate L by holding the sprocket in place, as well as the pawl S', in addition to its other office described. The bore N of the sprocket passes over the ratchet-wheels with just enough play to permit it to turn thereon, as upon a shaft, although other means may be used for carrying the sprocket, if desired, since I do not intend to confine myself to my particular mode in this regard. Neither do I wish to hold myself to the exact construction as to any of the other portions of my improved device, nor to the exact location thereof, since it is possible to slightly alter the same and still lie within the meaning and intent of the invention.

It is to be observed that the ground-wheels are free to turn on the axle and also that the axle is free to revolve in the bearings carrying it. The former conditions must exist in order that the wheels can revolve faster than the power-driven sprocket-wheel, which carries the axle with it, and the axle must revolve in order that the cam affixed thereto can revolve with said sprocket to hold the pawls in proper position relative to the ratchets. As in many other vehicles of this class, I am enabled to drive both wheels independently of one another and independent of the axle, but with mechanism much more simple and of lower cost than others, while at the same time providing a driving means that is thoroughly efficient in all respects.

I have illustrated in Figs. 9 and 10 a slight modification of the mechanism described. As before, the hub is indicated by the letter C and the axle by D. The ratchet-wheels are represented by 2 and 3, which are a part of the hub, together with a collar 4, the latter being of the same diameter, or larger, if desired, as the ratchet-wheels. The sprocket-wheel is bored out to receive this collar, which forms a partial bearing for said wheel; otherwise the same construction and arrangement is used, with the exception of a dome or cap 5, which is bored to receive the axle. Its flange 6 is secured to the sprocket-wheel by the stud-bolts 7. By this arrangement if it is desired to remove the wheel from its axle the retaining-nut is taken off. The wheel may then be withdrawn, its ratchet-wheels leaving the bore of the sprocket-wheel, the ratchets also leaving the pawls. The sprocket remains in a fixed position by reason of the cap 6 described; but if for any reason it is desired also to remove said wheel the stud-bolts 7 are withdrawn to free it, the cap remaining upon the axle. The advantages of this form may be at once recognized. A further advantage exists also that the dust and dirt cannot enter the pawls or ratchets, since the device is tightly closed at each side. The parts can be reassembled in a reverse order with perfect ease.

I claim—

1. A compensating mechanism comprising ground-wheels, a revoluble axle upon which the wheels are free to turn, a member affixed to each ground-wheel and provided with two series of oppositely-faced ratchet-teeth, a driving-wheel for each ratchet member, the same being free to turn relatively to the axle, pawls carried by said driving-wheel for engaging either set of ratchet-teeth, and means secured to the axle by which the pawls are reversed in position by the shifting of the power-wheel with reference thereto.

2. A compensating mechanism comprising a revoluble axle, a ground-wheel revoluble thereon, a member rigid with relation to the wheel and revoluble therewith and having two series of oppositely-faced teeth substantially as shown, a power-wheel free of both the axle and ground-wheel, but adapted to drive the latter in either direction, a pair of pawls in the power-wheel each of which engages its respective series of ratchet-teeth, and a cam member rigidly carried on the axle and revoluble therewith and with which the pawls contact, a reversal of movement of the power-wheel in either direction causing the pawls to shift about the cam member, the latter at such times changing the relation of the pawls and the ratchet-teeth, said cam remaining stationary during such reversal, due to friction between the axle carrying it and the bearing in which said axle is carried, and a member carried by the power-wheel for causing the cam member and axle to revolve with it after each reversal of said power-wheel.

3. In mechanism of the character set forth, a revoluble axle, the ground-wheels revoluble thereon, a member carried by and rigid with each wheel for driving it and provided each with two series of oppositely-facing ratchet-teeth, a power-wheel for each ratchet member, the former being free of the axle and ground-wheel, a pair of pawls for each ratchet member the said pawls engaging their respective ratchet-teeth, means secured to the axle with which the pawls contact, the said means removing one of the pawls from the ratchet member and permitting the other to engage said member when the direction of rotation of the power-wheel is reversed, said pawls being carried around the said means by the power-wheel, the axle remaining stationary at such times, and means on the power-wheel for engaging and revolving the pawl-reversing means and the axle after the pawls have been thus reversed in position, the power-wheel then driving the ground-wheel by means of the pawl thus placed in engagement.

4. In mechanism of the character described, a revoluble axle, ground-wheels revoluble thereon, a member for driving each wheel, there being two series of oppositely-faced ratchet-teeth thereon, a power-wheel carried upon the ratchet member and adapted for oscillation thereon but also adapted to engage and drive the same at each limit of the oscillatory movement, means between the power-wheel and ratchet-teeth for driving the ground-wheel, and means between the axle and the power-wheel for changing the driving relation of the means in said power-wheel to that of the teeth for driving the ground-wheel in one direction or the other while permitting said wheel to revolve faster than the power-wheel.

5. In mechanism of the character described a revoluble axle, ground-wheels revoluble thereon, a power-wheel for driving each wheel said power-wheels being independent of the ground-wheels and axle, as to direct rigid connection therewith, a member having rigid driving relation with each ground-wheel and with which its respective power-wheel engages for driving said member and ground-wheel in either direction and upon which said power-wheel oscillates in changing its driving relation thereto, and means for producing such change during such oscillations, there being provision for permitting the ground-wheel to revolve at a faster rate of speed than that at which the power-wheel is driven.

6. In mechanism of the character described, ground-wheels, a revoluble axle upon which the said wheels are revoluble, a power-wheel independent of the axle and wheel, there being one of such wheels for each ground-wheel, a ratchet member secured to each ground-wheel for driving it said member having a series of ratchet-teeth facing in one direction and a series facing in the other direction and with relation to which ratchet member the power-wheel is adapted to oscillate, means within the power-wheel for engaging one or the other of the two series of ratchet-teeth, the relation of such engagement being determined by the direction of oscillation of the power-wheel, such ratchet member and the ground-wheels being driven in the direction in which the power-wheel is oscillated.

7. In mechanism of the character described, ground-wheels, a revoluble axle upon which the said wheels are revoluble, a power-wheel independent of the axle and wheel, there being one of such wheels for each ground-wheel, a ratchet member secured to each ground-wheel for driving the latter, said member having a series of ratchet-teeth facing in one direction and a series of similar teeth facing in the opposite direction, the power-wheel being adapted to oscillate with relation to said ratchet member, means within the power-wheel for engaging one or the other of the two series of ratchet-teeth, the relation of such engagement being determined by the direction of oscillation of the power-wheel, such ratchet member and the ground-wheels being driven in the direction in which the power-wheel is oscillated, and means for limiting the extent of oscillation of the power-wheel in either direction and for maintaining the changed relation between the power-wheel and ratchet member.

8. In mechanism of the character described, ground-wheels, a revoluble axle upon which the said wheels are revoluble, a power-wheel independent of the axle and wheel, there being one of such wheels for each ground-wheel, a ratchet member secured to each ground-wheel for driving the latter, said member having a series of ratchet-teeth facing in one direction and a series of similar teeth facing in the opposite direction, the power-wheel being adapted to oscillate with relation to said ratchet member, means within the power-wheel for engaging one or the other of the two series of ratchet-teeth, the relation of such engagement being determined by the direction of oscillation of the power-wheel, such ratchet member and the ground-wheels being driven in the direction in which the power-wheels are driven, means for limiting the extent of oscillation of the power-wheel in either direction, and other means for maintaining the driving relation between the power-wheel and ratchet member except for permitting the ground-wheel to turn faster than the power-wheel at the times described.

9. In mechanism of the character described, a revoluble axle, ground-wheels revoluble thereon, a ratchet member affixed to each wheel, the same having two series of oppositely-faced teeth, a power-wheel for each ground-wheel and carried independent of the said wheel, axle and ratchet member, a pair of spring-held pawls in the power-wheel each of which engages its respective set of teeth of the ratchet, a cam secured on the axle and revoluble therewith, both pawls contacting therewith, the oscillation of the power-wheel in one direction moving the pawls around the periphery of the cam, the latter causing one pawl to move away from the teeth while permitting the other to engage the teeth, an oscillation in the other direction reversing that position of the pawls, and means for limiting the extent of oscillation of the power-wheel in either direction with reference to the cam for the purposes described and means for rotating said cam with the power-wheel to maintain the pawls in proper driving relation after being changed in position.

10. In mechanism of the character described, a revoluble axle, ground-wheels revoluble thereon, the axle and wheels also revoluble as a unit, a ratchet member affixed to each wheel, each having two series of oppositely-faced teeth, a power-wheel for each ground-wheel and carried independent thereof and independent of the axle and ratchet member, a pair of spring-held pawls set radially in the power-wheel and adapted to engage the ratchet-teeth, the power-wheel adapted to oscillate in either direction relatively to the ratchet member for the purposes described, a cam secured to the axle and about which the pawls travel in the oscillatory movement of the power-wheel, the cam and axle remaining stationary during such movement due to friction between the latter and its bearings, one of the pawls being permitted to shift into engagement with the ratchet member the other being removed therefrom by the cam, and means for carrying the cam and axle with the power-wheel, after the shifting of the pawls has taken place, to drive the ground-wheel in a desired direction.

11. In mechanism of the character described a revoluble axle, ground-wheels therefor, the same being revoluble on the said axle, a ratchet member rigid with the ground-wheel and having two series of ratchet-teeth, each series facing in an opposite direction, the faces of the teeth of one series coinciding in position with the faces of the teeth of the other series as shown, a power-wheel carried on the ratchet member and free to oscillate relatively thereto and to the axle and ground-wheels, a pair of pawls carried in and by the power-wheel and shiftable toward and away from the direction of the axis thereof and spring-held with a tendency toward said axis, a cam secured on the axle with whose periphery the pawls engage, the power-wheel when reversing its direction of rotation carrying the pawls around said cam to change their relative positions, the cam and axle being stationary at that time as described, and means on the power-wheel for turning the cam and shaft with it, after the pawls have been reversed, to maintain said pawls in the said reversed position for the purposes described.

12. A compensating mechanism comprising the ground-wheel, a pair of ratchet-wheels having oppositely-placed teeth secured to said wheel, the axle upon which the wheel with its ratchet-wheels is adapted to revolve, a power-driven wheel carried on the ratchet-wheel, a pair of pawls carried in the power-wheel, one adapted for engaging one of the ratchet-wheels and the other adapted to engage the remaining ratchet-wheel but one of which is in engagement at a time, a cam carried by and secured to the axle and operated by the power-wheel to disengage one of the pawls and permitting engagement of the other with its respective ratchet-wheel, the ground-wheel adapted to revolve faster than the power-wheel at the times described and the ratchets to revolve within the said power-wheel beneath the pawl then in driving engagement.

13. A compensating mechanism comprising the ground-wheel and axle, a pair of oppositely-placed ratchet-wheels affixed to said ground-wheel, a power-wheel bored out and carried upon the ratchet-wheels and adapted for oscillation thereon, a pair of spring-held pawls carried by said power-wheel and extending into the bore of the wheel to engage the teeth of the ratchet-wheels, but one of said pawls adapted to engage at a time, a cam carried on the axle and with whose periphery the said pawls contact said cam adapted for changing the position of the pawls for the purposes described.

14. In mechanism of the character described in which the ground-wheels are driven independently of one another and independent of the axle on which they are free to turn, the combination of the axle D and ground-wheels A, the two series of oppositely-faced ratchet-teeth H, J, for each wheel A, the faces of which coincide as described and shown and which are rigid with relation to the hubs of the ground-wheels, the sprocket-wheel M partially revoluble with relation to said teeth, the ground-wheels, and axle, the pawls S, S', in the power-wheel arranged radially therein and substantially ninety degrees apart on the wheel, the ratchet-teeth being constantly engaged by one or the other of the pawls, the cam O secured to the axle and having a greater and a lesser diameter, those diameters lying at right angles to one another substantially as shown, the springs U for holding the pawls in contact with the periphery of the cam, the power-wheel and pawls adapted to shift with relation to the cam and axle for changing the position of the pawls, the greater diameter of the cam causing a pawl to leave the ratchet, the shorter diameter permitting the other pawl to engage the ratchet as the respective pawls travel about said cam, the ratchet-teeth and ground-wheel adapted to "run ahead" of power-wheel and its pawls, and the member W for limiting the oscillating movement of the power-wheel and pawls and holding the cam to revolve with said power-wheel to maintain the said pawls in a stationary driving position.

In testimony whereof I affix my signature in presence of two witnesses.

WILLIAM E. BIRKET.

Witnesses:
L. M. THURLOW,
E. J. ABERSOL.